US010162358B2

(12) United States Patent
Song et al.

(10) Patent No.: US 10,162,358 B2
(45) Date of Patent: Dec. 25, 2018

(54) UNMANNED VEHICLE, METHOD, APPARATUS AND SYSTEM FOR POSITIONING UNMANNED VEHICLE

(71) Applicant: Baidu Online Network Technology (Beijing) Co., Ltd., Beijing (CN)

(72) Inventors: Shiyu Song, Beijing (CN); Wenbo Li, Beijing (CN); Tianlei Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 60 days.

(21) Appl. No.: 15/282,984

(22) Filed: Sep. 30, 2016

(65) Prior Publication Data
US 2017/0344018 A1   Nov. 30, 2017

(30) Foreign Application Priority Data

May 24, 2016   (CN) .......................... 2016 1 0349119

(51) Int. Cl.
*G05D 1/02*  (2006.01)
*G05D 1/00*  (2006.01)
*G06F 17/16*  (2006.01)
*G06N 7/00*  (2006.01)
*G01C 21/00*  (2006.01)
*G01S 17/89*  (2006.01)
*G01S 7/48*  (2006.01)

(52) U.S. Cl.
CPC .......... *G05D 1/0236* (2013.01); *G01C 21/00* (2013.01); *G01S 7/4808* (2013.01); *G01S 17/89* (2013.01); *G05D 1/0088* (2013.01); *G05D 1/024* (2013.01); *G05D 1/0274* (2013.01); *G06F 17/16* (2013.01); *G06N 7/005* (2013.01); *G05D 2201/0213* (2013.01)

(58) Field of Classification Search
CPC .... G05D 1/0236; G05D 1/0088; G06F 17/16; G06N 7/005
See application file for complete search history.

(56) References Cited

U.S. PATENT DOCUMENTS

| | | | |
|---|---|---|---|
| 2011/0164037 A1* | 7/2011 | Yoshida | G06T 15/08 345/419 |
| 2014/0376777 A1* | 12/2014 | Churchill | G01C 21/26 382/104 |
| 2017/0361468 A1* | 12/2017 | Cheuvront | A47L 9/2805 |

FOREIGN PATENT DOCUMENTS

CN        104764457 A       7/2015

* cited by examiner

*Primary Examiner* — Aaron L Troost
(74) *Attorney, Agent, or Firm* — Knobbe, Martens, Olson & Bear, LLP

(57) ABSTRACT

Disclosed embodiments include an unmanned vehicle, a method, apparatus and system for positioning an unmanned vehicle. In some embodiments, the method includes: acquiring first laser point cloud height value data matching a current position of the unmanned vehicle, the first laser point cloud height value data; converting the first laser point cloud height value data into laser point cloud projection data in a horizontal earth plane; determining a first matching probability of the laser point cloud projection data in a predetermined range of a laser point cloud height value map; and determining a position of the unmanned vehicle in the laser point cloud height value map based on the first matching probability. The embodiment implements an accurate positioning on the current position of the unmanned vehicle.

20 Claims, 6 Drawing Sheets

UNMANNED VEHICLE, METHOD, APPARATUS AND SYSTEM FOR POSITIONING UNMANNED VEHICLE

CROSS-REFERENCE TO RELATED APPLICATIONS

This application is related to and claims priority from Chinese Application No. 201610349119.9, filed on May 24, 2016, entitled "UNMANNED VEHICLE, METHOD, APPARATUS AND SYSTEM FOR POSITIONING UNMANNED VEHICLE," the entire disclosure of which is hereby incorporated by reference.

TECHNICAL FIELD

The present application relates to the field of vehicle engineering technology, in particular to the field of unmanned vehicles, and more particularly, to an unmanned vehicle, a method, apparatus and system for positioning an unmanned vehicle.

BACKGROUND

A driverless vehicle (hereinafter referred to as an unmanned vehicle) is a modern vehicle that can sense surrounding environment without manual intervention, make decisions and judgments on scenarios, and control itself.

A positioning system plays a pivotal role in the automatic drive process of the unmanned vehicle. Other modules, such as a sensing module and a path planning module, conduct corresponding operations based on, to various degrees, the positioning result generated by the positioning system. The accuracy of the positioning is one of the key points directly affecting whether or not unmanned vehicles can succeed.

In the prior art, Real-time kinematic (RTK) positioning of a Global Positioning System (GPS) is mainly used to determine the position of an unmanned vehicle.

However, the RTK positioning method in the prior art may generate relatively large positioning errors when a GPS satellite signal is shielded or the multi-path effect of a complicated environment is intense. Therefore, a high precision and stability positioning result cannot be provided.

SUMMARY

An objective of some embodiments of the present application is to provide an improved unmanned vehicle, an improved method, apparatus and system for positioning an unmanned vehicle, so as to solve the technical problems mentioned in the BACKGROUND.

In the first aspect, some embodiments of the present application provide a method for positioning an unmanned vehicle based on a laser point cloud height value matching, comprising: acquiring first laser point cloud height value data matching a current position of the unmanned vehicle, the first laser point cloud height value data comprising first coordinates of laser points and height values corresponding to the laser points within the first laser point cloud height value data; converting the first laser point cloud height value data into laser point cloud projection data in a horizontal earth plane; determining a first matching probability of the laser point cloud projection data in a predetermined range of a laser point cloud height value map by using a position of a predetermined prior positioning position in the laser point cloud height value map as an initial position; and determining a position of the unmanned vehicle in the laser point cloud height value map based on the first matching probability.

In the second aspect, some embodiments of the present application provide an apparatus for positioning an unmanned vehicle based on a laser point cloud height value matching, comprising: an acquisition module configured to acquire first laser point cloud height value data matching a current position of an unmanned vehicle, the first laser point cloud height value data comprising first coordinates of laser points and height values corresponding to the laser points within the first laser point cloud height value data; a conversion module configured to convert the first laser point cloud height value data into laser point cloud projection data in a horizontal earth plane; a matching probability determination module configured to determine a first matching probability of the laser point cloud projection data in a predetermined range of a laser point cloud height value map by using a position of a predetermined prior positioning position in the laser point cloud height value map as an initial position; and a position determination module configured to determine a position of the unmanned vehicle in the laser point cloud height value map based on the first matching probability.

In the third aspect, some embodiments of the present application provide an unmanned vehicle, comprising: a point cloud height value data collection apparatus configured to collect laser point cloud height value data of a current position of the unmanned vehicle, wherein the laser point cloud height value data comprises coordinates of laser points and height values corresponding to the laser points; a storage apparatus configured to store a laser point cloud height value map; and a processor configured to project the laser point cloud height value data to a horizontal earth plane to generate laser point cloud projection data; determine a first matching probability of the laser point cloud projection data in a predetermined range of the laser point cloud height value map by using a position of a predetermined prior positioning position in the laser point cloud height value map as an initial position; and determine a position of the unmanned vehicle in the laser point cloud height value map based on the first matching probability.

In the fourth aspect, some embodiments of the present application provide a system for positioning an unmanned vehicle, comprising an unmanned vehicle and a positioning server. The unmanned vehicle comprises a point cloud height value data collection apparatus and a first communication apparatus. The point cloud height value data collection apparatus is configured to collect laser point cloud height value data of a current position of the unmanned vehicle, wherein the laser point cloud height value data comprises first coordinates of laser points and height values corresponding to the laser points. The first communication apparatus is configured to send the laser point cloud height value data to the positioning server. The positioning server comprises a second communication apparatus, a memory, and a processor. The second communication apparatus is configured to receive the laser point cloud height value data sent by the first communication apparatus. The memory is configured to store a laser point cloud height value map. The processor is configured to project the laser point cloud height value data to a horizontal earth plane to generate laser point cloud projection data, determine a first matching probability of the laser point cloud projection data in a predetermined area of the laser point cloud height value map by using a position of a predetermined prior positioning position in the laser point cloud height value map as an initial position, and determine a positioning result of the unmanned vehicle based on the first matching probability. The positioning result comprises position information of the unmanned vehicle in the laser point cloud height value map. The second communication apparatus is further configured to send the positioning result to the first communication apparatus.

In the unmanned vehicle, the method, apparatus and system for positioning an unmanned vehicle as provided in some embodiments of the present application, by converting the first laser point cloud height value data matching the current position of the unmanned vehicle into the laser point cloud projection data, matching the laser point cloud projection data with areas in a predetermined range of the laser point cloud height value map, and determining the position of the unmanned vehicle in the laser point cloud height value map based on the matching probability, an accurate positioning on the current position of the unmanned vehicle is implemented, and the defect in the prior art that the GPS-based RTK positioning has large errors due to a shielded GPS satellite signal or an intense multi-path effect of a complicated environment is avoided.

BRIEF DESCRIPTION OF THE DRAWINGS

Other features, objects, and advantages of the present application will become more apparent from the detailed description of the non-limiting embodiments made in reference to the accompany drawings, in which.

DETAILED DESCRIPTION

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
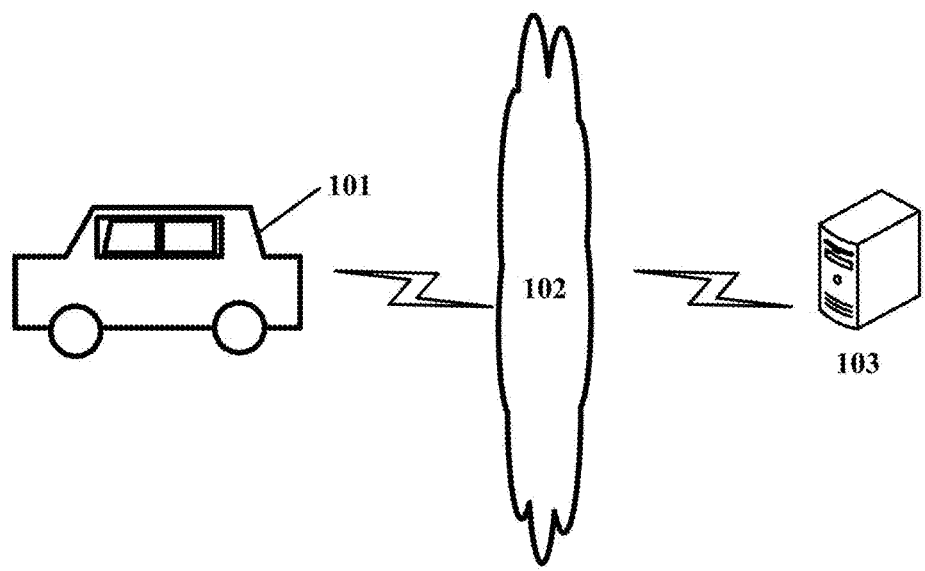
FIG. 1 is a diagram showing a system architecture in which some embodiments of the present application may be applied.

FIG. 1 shows a system architecture 100 in which a method for positioning an unmanned vehicle based on a laser point cloud height value matching or an apparatus for positioning an unmanned vehicle based on a laser point cloud height value matching may be applied according to an embodiment of the present application.

As shown in FIG. 1, the system architecture 100 may comprise an unmanned vehicle 101, a network 102 and a server 103. The network 102 is a medium configured to provide a communication link between the unmanned vehicle 101 and the server 103. The network 102 may comprise various connection types, such as wired and wireless communication links, or optical fiber cables.

The unmanned vehicle 101 may interact with the server 103 through the network 102, so as to receive or send messages, and the like. The unmanned vehicle 101 may be mounted with a laser point cloud collection apparatus, a communication apparatus, a processor, and the like.

The server 103 may be a server providing various services, for example, a server processing laser point cloud height value data collected by the unmanned vehicle 101. The server 103 may process, for example, analyze, the received laser point cloud height value data, and return a processing result (for example, positioning information of the unmanned vehicle) to the unmanned vehicle 101.

It should be noted that, the method for positioning an unmanned vehicle based on a laser point cloud height value matching provided in the embodiment of the present application may be executed by the unmanned vehicle 101, or may be executed by the server 103. Alternatively, some steps may be executed by the unmanned vehicle 101 and the other steps may be executed by the server 103. Correspondingly, the apparatus for positioning an unmanned vehicle based on a laser point cloud height value matching may be disposed in the server 103, or disposed in the unmanned vehicle 101. Alternatively, some modules may be disposed in the server 103 and the other modules may be disposed in the unmanned vehicle 101.

It should be understood that the numbers of the unmanned vehicle 101, the network 102 and the server 103 in FIG. 1 are merely schematic. According to actual requirements, any number of unmanned vehicles 101, networks 102 and servers 103 may be provided.

Figure 2:
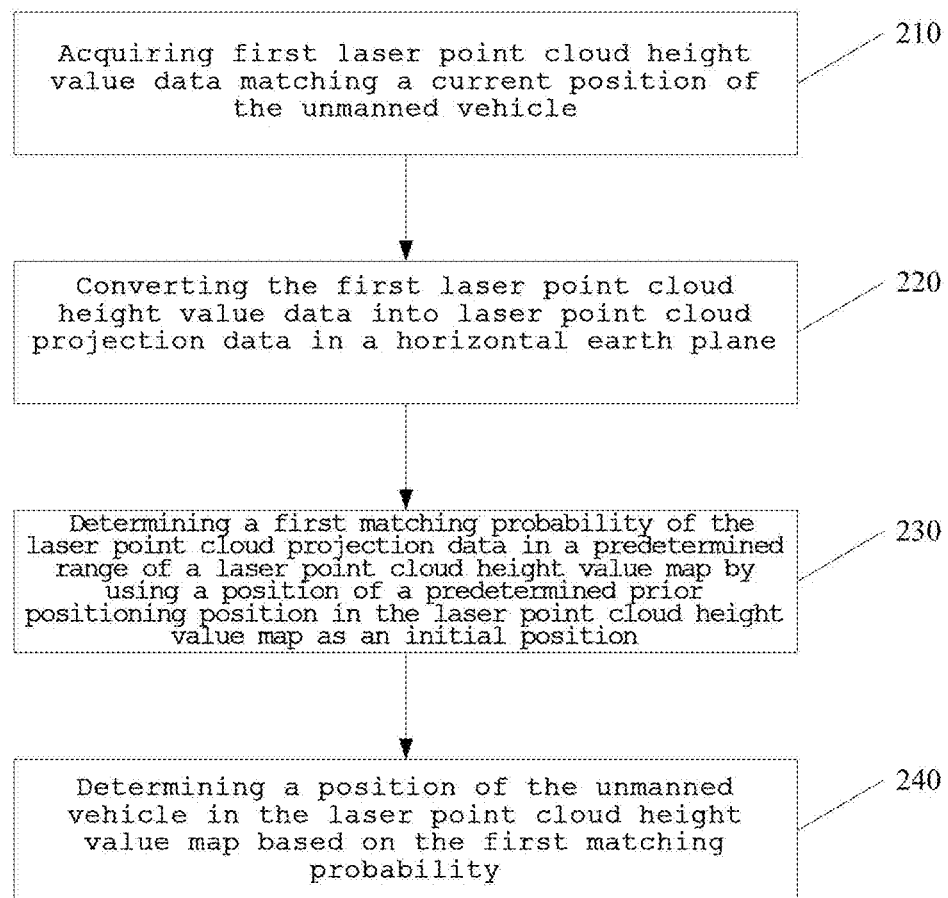
FIG. 2 is a flow chart of a method for positioning an unmanned vehicle based on a laser point cloud height value matching according to an embodiment of the present application.

Further referring to FIG. 2, a process 200 of a method for positioning an unmanned vehicle based on a laser point cloud height value matching according to an embodiment of the present application is shown. The method for positioning an unmanned vehicle based on a laser point cloud height value matching comprises the following steps:

At step 210, first laser point cloud height value data matching a current position of the unmanned vehicle is acquired. The first laser point cloud height value data comprises first coordinates of laser points and height values corresponding to the laser points within the first laser point cloud height value data.

Provided that a coordinate of a reflected laser point acquired after laser irradiates an object is (x, y, z), z may be used as a height value of the laser point.

In some alternative implementations, if an apparatus on which the method for positioning an unmanned vehicle based on a laser point cloud height value matching in this embodiment is applied is the unmanned vehicle in FIG. 1, the laser point cloud height value collection apparatus disposed on the unmanned vehicle may be used to collect the first laser point cloud height value data of the current position of the unmanned vehicle.

Alternatively, in some other alternative implementations, if an apparatus on which the method for positioning an unmanned vehicle based on a laser point cloud height value matching in this embodiment is applied is the server in FIG. 1, the laser point cloud height value collection apparatus disposed on the unmanned vehicle may be used to collect the first laser point cloud height value data of the current position of the unmanned vehicle, and upload the data to the server in a wired or wireless connection manner, thereby implementing the acquisition of the first laser point cloud height value data. It should be noted that, the wireless connection manner may comprise, but not limited to, 3G/4G connection, WiFi connection, Bluetooth connection, WiMAX connection, Zigbee connection, ultra wideband (UWB) connection, and other wireless connection manners that are known or will be developed in the future.

At step 220, the first laser point cloud height value data is converted into laser point cloud projection data in a horizontal earth plane.

By projecting the first laser point cloud height value data to the horizontal earth plane, laser point cloud height values of coordinate positions in a three-dimensional space acquired at step 210 may be converted into the laser point cloud height values of coordinate positions in the horizontal earth plane.

At step 230, a first matching probability of the laser point cloud projection data in a predetermined range of a laser point cloud height value map is determined by using a position of a predetermined prior positioning position in the laser point cloud height value map as an initial position.

Specifically, the prior positioning position may be the current position of the unmanned vehicle determined in another positioning method, or may be the current position of the unmanned vehicle obtained by a prediction algorithm. The prior positioning position may be "corrected" by determining, in a predetermined range comprising the prior positioning position within the laser point cloud height value map, the first matching probabilities of the laser point cloud projection data and various areas in the predetermined range, such that a finally determined positioning result of the unmanned vehicle has less errors.

At step 240, a position of the unmanned vehicle in the laser point cloud height value map is determined based on the first matching probability.

For example, if the first matching probability of the laser point cloud projection data and an area in the predetermined range of the laser point cloud height value map may be higher than first matching probabilities of the laser point cloud projection data and other areas in the predetermined range of the laser point cloud height value map, in some alternative implementations, the area having the higher first matching probability may be used as the current position of the unmanned vehicle in the laser point cloud height value map.

Alternatively, in some other alternative implementations, the first matching probabilities of the laser point cloud projection data and the areas in the predetermined range of the laser point cloud height value map may be processed, and the current position of the unmanned vehicle in the laser point cloud height value map may be further determined from the processed result.

In the method for positioning an unmanned vehicle based on a laser point cloud height value matching according to this embodiment, by converting the first laser point cloud height value data matching the current position of the unmanned vehicle into the laser point cloud projection data, matching the laser point cloud projection data with areas in a predetermined range of the laser point cloud height value map, and determining the position of the unmanned vehicle in the laser point cloud height value map based on the matching probability, the prior positioning position can be corrected, and a precise positioning on the unmanned vehicle can be implemented.

Figure 3:
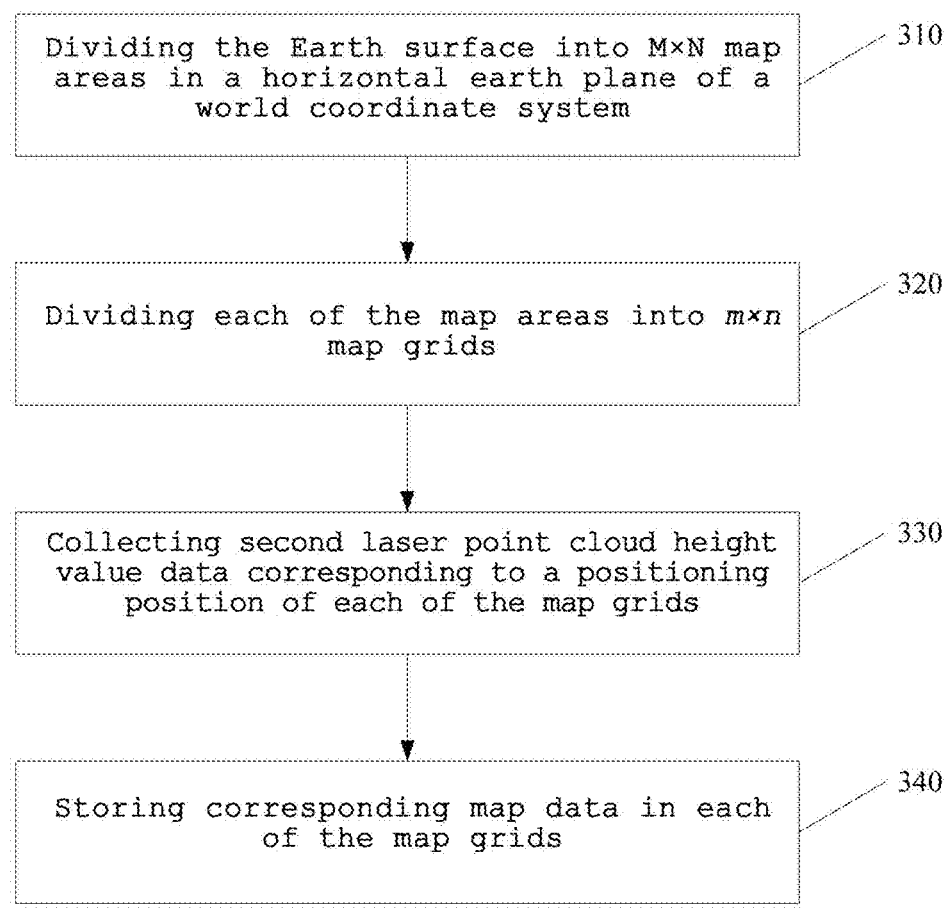
FIG. 3 is a schematic flow chart of generating a laser point cloud height value map in the method for positioning an unmanned vehicle based on a laser point cloud height value matching according to some embodiments of the present application.

In some alternative implementations, the laser point cloud height value map in the method for positioning an unmanned vehicle based on a laser point cloud height value matching according to this embodiment may be generated by a process 300 as shown in FIG. 3.

Specifically, at step 310, the Earth surface is divided into M×N map areas in a horizontal earth plane of a world coordinate system, wherein the map areas may have, for example, an identical size and shape.

In some alternative implementations, the world coordinate system may adopt a Universal Transverse Mercator (UTM) coordinate system.

At step 320, each of the map areas is further divided into m×n map grids, the map grids having an identical size and shape.

The map area obtained by the division at step 310 may cover a relatively large area range. In the process of generating the laser point cloud height value map, the number of laser points in each of the map areas may have a considerable order of magnitude, which leads to a large amount of computation for the positioning processing. Moreover, when the map area may cover a relatively large area range, the precision of a positioning result obtained based on the map is relatively low. Therefore, at step 320, each of the map areas may be further divided, thereby reducing the amount of computation for the positioning processing, as well as improving the positioning precision of the positioning result.

At step 330, second laser point cloud height value data corresponding to positioning positions of the map grids is collected, the second laser point cloud height value data comprising second coordinates of laser points in the world coordinate system and height values corresponding to the laser points within the second laser point cloud height value data.

For example, provided that an abscissa of a map grid is $x \in [x_a, x_b]$, and an ordinate of the map grid is $y \in [y_c, y_d]$. At this step, height values of laser points whose world coordinates are located in the range may be collected, and height values of laser points falling into coordinate ranges of the map grids on the Earth surface may be collected according to the similar manner.

At step 340, corresponding map data is stored in each of the map grids. The map data comprises an average of height values of laser points in the positioning position corresponding to the map grid and the number of laser points in the positioning position corresponding to the map grid.

Referring to FIG. 2 again, in some alternative implementations, at step 210 of FIG. 2, the first coordinate of the laser point may be a coordinate of each of the laser points within the first laser point cloud height value data, in a vehicle coordinate system of the unmanned vehicle.

In the alternative implementations, the converting the first laser point cloud height value data into laser point cloud projection data in a horizontal earth plane at step 220 in FIG. 2 may further comprise: converting the first laser point cloud height value data into third laser point cloud height value data at step 221.

Specifically, the third laser point cloud height value data may comprise, for example, third coordinates of laser points and height values corresponding to the laser points within the first laser point cloud height value data, wherein the third coordinate is a coordinate of the laser point within the first laser point cloud height value data in the world coordinate system. The third coordinate X' may be defined as:

$$X'=(x',y',z')^T=RX+T \quad (1)$$

wherein R is a rotation matrix for a transformation from the vehicle coordinate system of the unmanned vehicle to the world coordinate system, $X=(x, y, z)^T$ is the first coordinate of the laser point within the first laser point cloud height value data, and T is a translation matrix for a transformation from the vehicle coordinate system of the unmanned vehicle to the world coordinate system.

At step 222, the third laser point cloud height value data is projected to the horizontal earth plane to generate the laser point cloud projection data.

The laser point cloud projection data may comprise projection coordinates of the laser points within the first laser point cloud height value data, an average of height values of laser points in projection grids, and the number of the laser points in the projection grids.

The projection coordinate X" of the laser point within the first laser point cloud height value data meets:

$$X''=(x'',y'')^T=SX' \quad (2)$$

where S is a projection matrix, and meets:

$$S = \begin{bmatrix} 1 & 0 & 0 \\ 0 & 1 & 0 \end{bmatrix}.$$

By means of the formula (1) and the formula (2), the laser point cloud data in the three-dimensional space collected based on the vehicle coordinate system of the unmanned vehicle (i.e., the first laser point cloud height value data) may be converted into the laser point cloud data in the horizontal earth plane based on the world coordinate system (i.e., the laser point cloud projection data).

Specifically, each of the projection grids has a size and shape identical to that of the map grid. For example, the projection grid and the map grid may be congruent rectangles.

In some alternative implementations, step 230 in FIG. 2 may be further implemented through the following processes.

At step 231, a center projection grid O(x, y) of the laser point cloud projection data is overlapped with a map grid corresponding to the prior positioning position O' ($x_o$, $y_o$) in the laser point cloud height value map, wherein the center projection grid O(x, y) is a projection grid representing a vehicle body of the unmanned vehicle in the laser point cloud projection data.

In some application scenarios, the laser point cloud height value collection apparatus mounted on the unmanned vehicle may collect laser point cloud height value data around the unmanned vehicle in a predetermined radius. The laser point cloud height value data collected by the laser point cloud height value collection apparatus is located in a sphere with the unmanned vehicle as a center and the predetermined radius as the radius. In these application scenarios, a part of data in the sphere may be cropped for a subsequent matching positioning. For example, a cuboid or a cube of the sphere is constructed, and laser point cloud height values of laser points falling in the cuboid or cube are used as laser point cloud height value data (that is, the first laser point cloud height value data) used for positioning. Therefore, in these application scenarios, in the finally generated laser point cloud projection data, a center projection grid O(x, y) representing the unmanned vehicle just falls in the geometric center of the whole projection range.

At step 232, a first matching probability of a projection range of the laser point cloud projection data and a corresponding map range is determined.

Provided that a projection rage formed by the laser point cloud projection data comprises a 5×5 projection grid, a map range corresponding to the projection range also comprises a 5×5 map grid.

In some application scenarios, the first matching probability of the projection range and the corresponding map range may be determined, for example, by the following formula (3):

$$P(x, y) = \alpha - \frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r} \quad (3)$$

where (x, y) is a world coordinate of the center projection grid, ($x_i$, $y_j$) is a world coordinate of the projection grid in the projection range of the laser point cloud projection data, $\alpha$ is a preset constant parameter, $\mu_{x_i,y_j}^m$ is an average of height values of laser points in the map grid whose world coordinate is ($x_i$, $y_j$)$\mu_{x_i,y_j}^r$ is an average of height values of laser points in the projection grid whose world coordinate is ($x_i$, $y_j$), and $N_{x_i,y_j}^r$ is the number of laser points in the projection grid whose world coordinate is ($x_i$, $y_j$). $x_1$ is an abscissa value of a map grid having the minimum abscissa in the map range, and $x_m$ is an abscissa value of a map grid having the maximum abscissa in the map range. Correspondingly, $y_1$ is an ordinate value of the map grid having the minimum ordinate in the map range, and $y_n$ is an ordinate value of the map grid having the maximum ordinate in the map range.

In other words, in the formula (3), P(x, y) is a power function with a as the base number, and $$\frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r}$$

as the power.

At step 233, the center projection grid O(x, y) is moved by a predetermined offset k, and the first matching probabilities of the laser point cloud projection data corresponding to the current center projection grid O(x, y) are determined, respectively.

Figure 4:
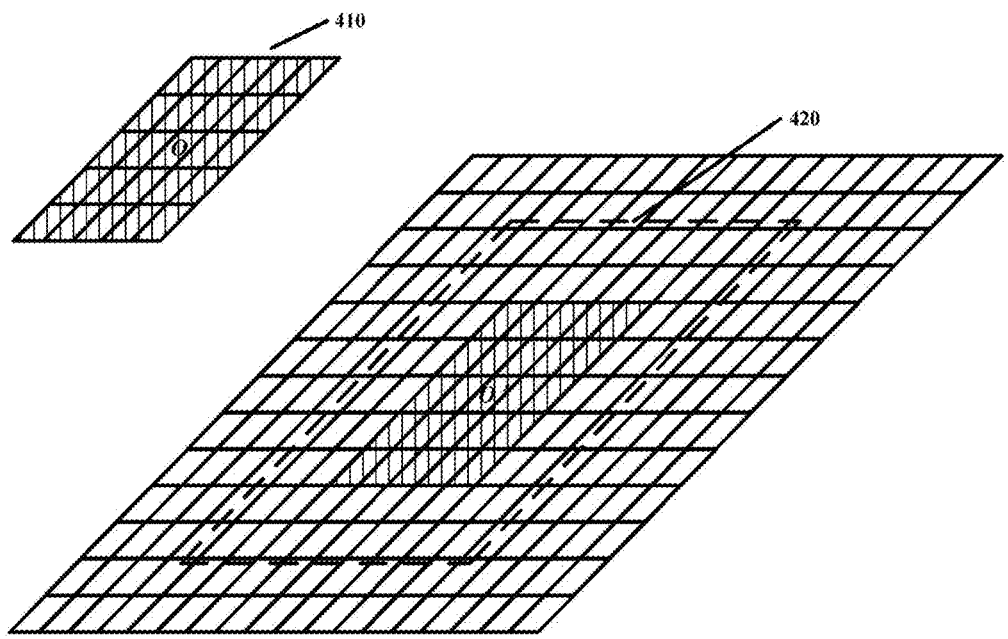
FIG. 4 is a schematic diagram of laser point cloud projection data moving in a predetermined range of the laser point cloud height value map in the method for positioning an unmanned vehicle based on a laser point cloud height value matching according to some embodiments of the present application.

Specifically, k may be understood as $(2k+1)^2$ map ranges formed by translating 1~k map grids respectively along the positive direction and the negative direction of the x axis and translating 1~k map grids respectively along the positive direction and the negative direction of the y axis, with the map grid corresponding to the prior positioning position O' $(x_o, y_o)$ as an initial position. As shown in FIG. 4, an area shown by a dashed box 420 is a predetermined range formed in the map when a projection range 410 formed by the laser point cloud projection data comprises a 5×5 projection grid and an offset k=2.

When the projection range moves in the predetermined range, the first matching probabilities of the laser point cloud projection data corresponding to the current center projection grid O(x, y) may be determined respectively based on the formula (3). In other words, the first matching probabilities of the projection ranges and the corresponding map ranges are determined respectively. By using what is shown in FIG. 4 as an example, when the projection range 410 moves in the predetermined range 420, $(2k+1)^2=25$ first matching probabilities may be obtained correspondingly.

In these alternative implementations, step 240 in FIG. 2 may further comprise determining a position of the unmanned vehicle in the laser point cloud height value map based on a weighted average of the first matching probabilities at step 241.

Specifically, the position $(\bar{x},\bar{y})$ of the unmanned vehicle in the laser point cloud height value map may be determined, for example, by using the following formula (4):

$$\begin{cases} \bar{x} = \dfrac{\sum\limits_{i=-k}^{k}\sum\limits_{j=-k}^{k} P'(x_0+i, y_0+j)^\alpha \cdot (x_0+i)}{\sum\limits_{i=-k}^{k}\sum\limits_{j=-k}^{k} P'(x_0+i, y_0+j)^\alpha} \\ \bar{y} = \dfrac{\sum\limits_{i=-k}^{k}\sum\limits_{j=-k}^{k} P'(x_0+i, y_0+j)^\alpha \cdot (y_0+j)}{\sum\limits_{i=-k}^{k}\sum\limits_{j=-k}^{k} P'(x_0+i, y_0+j)^\alpha} \end{cases} \quad (4)$$

where $(x_0, y_0)$ is a world coordinate of a map grid where the prior positioning position is located, and $P(x_0+i, y_0+j)$ is the first matching probability of the projection range and the corresponding map range when the center projection grid is located at the coordinate $(x_0+i, y_0+j)$ in the map.

Moreover, in some alternative implementations, after the first matching probability P of the laser point cloud projection data in the predetermined range of the laser point cloud height value map is determined through the formula (3), an updated first matching probability p' may be further obtained by updating the first matching probability P through the following formula (5):

$$P'(x,y) = \eta P(x,y)\bar{P}(x,y) \quad (5)$$

where $\bar{P}(x, y)$ is a probability of the unmanned vehicle currently presenting at a position having a world coordinate (x, y) predicted based on the previous positioning position, and η is a preset normalization coefficient.

In these alternative implementations, the first matching probability is updated. Correspondingly, the formula (4) may be evolved into the following formula (6):

$$\begin{cases} \bar{x} = \dfrac{\sum\limits_{i=-k}^{k}\sum\limits_{j=-k}^{k} P'(x_0+i, y_0+j)^\alpha \cdot (x+i)}{\sum\limits_{i=-k}^{k}\sum\limits_{j=-k}^{k} P'(x_0+i, y_0+j)^\alpha} \\ \bar{y} = \dfrac{\sum\limits_{i=-k}^{k}\sum\limits_{j=-k}^{k} P'(x_0+i, y_0+j)^\alpha \cdot (y_0+j)}{\sum\limits_{i=-k}^{k}\sum\limits_{j=-k}^{k} P'(x_0+i, y_0+j)^\alpha} \end{cases} \quad (6)$$

where $P'(x_0+i, y_0+j)$ is the first matching probability of the projection range and the corresponding map range updated through the formula (5) when the center projection grid is located at the coordinate $(x_0+i, y_0+j)$ in the map.

In some alternative implementations, in the method for positioning an unmanned vehicle based on a laser point cloud height value matching according to this embodiment, the determining the position of the unmanned vehicle in the laser point cloud height value map based on the first matching probability at step 240 may be implemented by using the following processes.

At step 242, the map grids in the predetermined range are further divided, so that each of the map grids is formed of p×q sub-grids.

At step 243, the position $(\bar{x},\bar{y})$ of the unmanned vehicle in the laser point cloud height value map may be determined by using the following formula (7):

$$\begin{cases} \bar{x} = \dfrac{\sum\limits_{x=x_o-k}^{x_o+k}\sum\limits_{y=y_o-k}^{y_o+k} \eta(x)P''(x, y)^\alpha \cdot x}{\sum\limits_{x=x_o-k}^{x_o+k}\sum\limits_{y=y_o-k}^{y_o+k} \eta(x)P''(x, y)^\alpha} \\ \bar{y} = \dfrac{\sum\limits_{x=x_o-k}^{x_o+k}\sum\limits_{y=y_o-k}^{y_o+k} \eta(y)P''(x, y)^\alpha \cdot y}{\sum\limits_{x=x_o-k}^{x_o+k}\sum\limits_{y=y_o-k}^{y_o+k} \eta(y)P''(x, y)^\alpha} \end{cases} \quad (7)$$

wherein:

$(x_0, y_0)$ is a world coordinate of a map grid where the prior positioning position is located, a step length of x varying in the range $[x_o-k, x_o+k]$ is $$\frac{1}{p},$$

and a step length of y varying in the range $[y_o-k, y_o+k]$ is $$\frac{1}{q}; \begin{cases} \eta(x) = \dfrac{1}{(x-x_o)^\beta} \\ \eta(y) = \dfrac{1}{(y-y_o)^\beta} \end{cases};$$

and

β is a preset constant parameter, and P''(x, y) is a probability obtained by conducting a bilinear interpolation on the first matching probability when a map grid where (x, y) is located is used as the center projection grid. Specifically, the first matching probability may be the first matching probability determined through the formula (3). Alternatively, the first matching probability may be the first matching probability updated through the formula (5).

Figure 5:
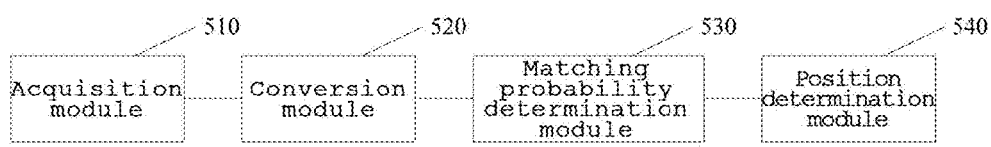
FIG. 5 is a schematic structural diagram of an apparatus for positioning an unmanned vehicle based on a laser point cloud height value matching according to an embodiment of the present application.

Further referring to FIG. 5, as an implementation of the methods shown in the above drawings, the present application provides an embodiment of an apparatus for positioning an unmanned vehicle based on a laser point cloud height value matching. The apparatus embodiment corresponds to the method embodiment shown in FIG. 2.

As shown in FIG. 5, the apparatus for positioning an unmanned vehicle based on a laser point cloud height value matching in this embodiment may comprise an acquisition module 510, a conversion module 520, a matching probability determination module 530 and a position determination module 540.

The acquisition module 510 may be configured to acquire first laser point cloud height value data matching a current position of an unmanned vehicle, the first laser point cloud height value data comprising first coordinates of laser points and height values corresponding to the laser points within the first laser point cloud height value data.

The conversion module 520 may be configured to convert the first laser point cloud height value data into laser point cloud projection data in a horizontal earth plane.

The matching probability determination module 530 may be configured to determine a first matching probability of the laser point cloud projection data in a predetermined range of a laser point cloud height value map by using a position of a predetermined prior positioning position in the laser point cloud height value map as an initial position.

The position determination module 540 may be configured to determine a position of the unmanned vehicle in the laser point cloud height value map based on the first matching probability.

In some alternative implementations, the laser point cloud height value map may comprise, for example, M×N map areas by dividing the Earth surface in a horizontal earth plane of a world coordinate system, the map areas having an identical size and shape. Each of the map areas may further comprise m×n map grids, the map grids having an identical size and shape. The laser point cloud height value map may further comprise an average of height values of laser points corresponding to the positioning position corresponding to the map grid and the number of laser points in the positioning position corresponding to the map grid.

In some alternative implementations, the first coordinate of each of the laser points may be a coordinate of each of the laser points within the first laser point cloud height value data, in a vehicle coordinate system of the unmanned vehicle.

The conversion module 520 may be further configured to convert the first laser point cloud height value data into third laser point cloud height value data, and to project the third laser point cloud height value data to the horizontal earth plane to generate the laser point cloud projection data. The third laser point cloud height value data comprises third coordinates of the laser points and height values corresponding to the laser points within the first laser point cloud height value data, wherein the third coordinate is a coordinate of a laser point within the first laser point cloud height value data in the world coordinate system.

In some alternative implementations, the third coordinate X' is X'=(x', y', z')$^T$=RX+T.

Specifically, R is a rotation matrix for a transformation from the vehicle coordinate system of the unmanned vehicle to the world coordinate system, X=(x, y, z)$^T$ is the first coordinate of the laser point within the first laser point cloud height value data, and T is a translation matrix for a transformation from the vehicle coordinate system of the unmanned vehicle to the world coordinate system.

In some alternative implementations, the laser point cloud projection data comprises projection coordinates of the laser points within the first laser point cloud height value data, an average of height values of laser points in projection grids, and the number of the laser points in the projection grids.

The projection coordinate X" of the laser point within the first laser point cloud height value data meets: X"=(x", y")$^T$=SX'.

S is a projection matrix, and meets:

$$S = \begin{bmatrix} 1 & 0 & 0 \\ 0 & 1 & 0 \end{bmatrix};$$

and
each of the projection grids has the size and shape identical to that of the map grid.

In some alternative implementations, the matching probability determination module 530 may be further configured to: overlap a center projection grid O(x, y) of the laser point cloud projection data with a map grid corresponding to the prior positioning position O'(x$_o$, y$_o$) in the laser point cloud height value map, wherein the center projection grid O(x, y) is a projection grid representing a vehicle body of the unmanned vehicle in the laser point cloud projection data; determine a first matching probability of a projection range of the laser point cloud projection data and a corresponding map range; and moving the center projection grid O(x, y) by a predetermined offset k, and determine the first matching probabilities of the laser point cloud projection data corresponding to the current center projection grid O(x, y), respectively.

The position determination module 540 may be further configured to determine a position of the unmanned vehicle in the laser point cloud height value map based on a weighted average of the first matching probabilities.

In some alternative implementations, the first matching probability P(x, y) corresponding to the center projection grid O(x, y) is defined as:

$$P(x, y) = \alpha \frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r};$$

where (x, y) is a world coordinate of the center projection grid, (x$_i$, y$_j$) is a world coordinate of the projection grid in the projection range of the laser point cloud projection data, α is a preset constant parameter, $\mu_{x_i,y_j}^m$ is an average of height values of laser points in the map grid whose world coordinate is (x$_i$, y$_j$), $\mu_{x_i,y_j}^r$ is an average of height values of laser points in the projection grid whose world coordinate is (x$_i$, y$_j$), and $N_{x_i,y_j}^r$ is the number of laser points in the projection grid whose world coordinate is (x$_i$, y$_j$).

In some alternative implementations, the matching probability determination module 530 may be further configured to: update the first matching probability based on the previous positioning position. The updated first matching probability P'(x, y) is defined as:

$(x,y)=\eta P(x,y)\overline{P}(x,y);$ where $\overline{P}(x, y)$ is a probability of the unmanned vehicle currently presenting at a position having a world coordinate (x, y) predicted based on the previous positioning position, and η is a preset normalization coefficient.

In some alternative implementations, the position $(\overline{x}, \overline{y})$ of the unmanned vehicle in the laser point cloud height value map determined by the position determination module 540 may be defined as:

$$\begin{cases} \overline{x} = \dfrac{\sum\limits_{i=-k}^{k}\sum\limits_{j=-k}^{k} P'(x_0+i, y_0+j)^\alpha \cdot (x+i)}{\sum\limits_{i=-k}^{k}\sum\limits_{j=-k}^{k} P'(x_0+i, y_0+j)^\alpha} \\ \overline{y} = \dfrac{\sum\limits_{i=-k}^{k}\sum\limits_{j=-k}^{k} P'(x_0+i, y_0+j)^\alpha \cdot (y_0+j)}{\sum\limits_{i=-k}^{k}\sum\limits_{j=-k}^{k} P'(x_0+i, y_0+j)^\alpha} \end{cases},$$

where $(x_0, y_0)$ is a world coordinate of a map grid where the prior positioning position is located.

In some other alternative implementations, the position determination module 540 may be further configured to further divide the map grids in the predetermined range, so that each of the map grids is formed of p×q sub-grids.

The position $(\overline{x}, \overline{y})$ of the unmanned vehicle in the laser point cloud height value map is defined as:

$$\begin{cases} \overline{x} = \dfrac{\sum\limits_{x=x_o-k}^{x_o+k}\sum\limits_{y=y_o-k}^{y_o+k} \eta(x) P''(x, y)^\alpha \cdot x}{\sum\limits_{x=x_o-k}^{x_o+k}\sum\limits_{y=y_o-k}^{y_o+k} \eta(x) P''(x, y)^\alpha} \\ \overline{y} = \dfrac{\sum\limits_{x=x_o-k}^{x_o+k}\sum\limits_{y=y_o-k}^{y_o+k} \eta(y) P''(x, y)^\alpha \cdot y}{\sum\limits_{x=x_o-k}^{x_o+k}\sum\limits_{y=y_o-k}^{y_o+k} \eta(y) P''(x, y)^\alpha} \end{cases};$$

wherein:
$(x_0, y_0)$ is a world coordinate of a map grid where the prior positioning position is located, a step length of x varying in the range $[x_o-k, x_o+k]$ is $$\frac{1}{p},$$

and a step length of y varying in the range $[y_o-k, y_o+k]$ is $$\frac{1}{q}; \begin{cases} \eta(x) = \dfrac{1}{(x-x_o)^\beta} \\ \eta(y) = \dfrac{1}{(y-y_o)^\beta} \end{cases};$$

and
β is a preset constant parameter, and P''(x, y) is a probability obtained by conducting bilinear interpolation on the first matching probability when a map grid where (x, y) is located is used as the center projection grid.

Persons skilled in the art may understand that the apparatus 500 for positioning an unmanned vehicle based on a laser point cloud height value matching further comprises some other well-known structures, such as a processor and a memory. These well-known structures are not shown in FIG. 5 to avoid unnecessarily obscuring the embodiment of the present disclosure.

Figure 6:
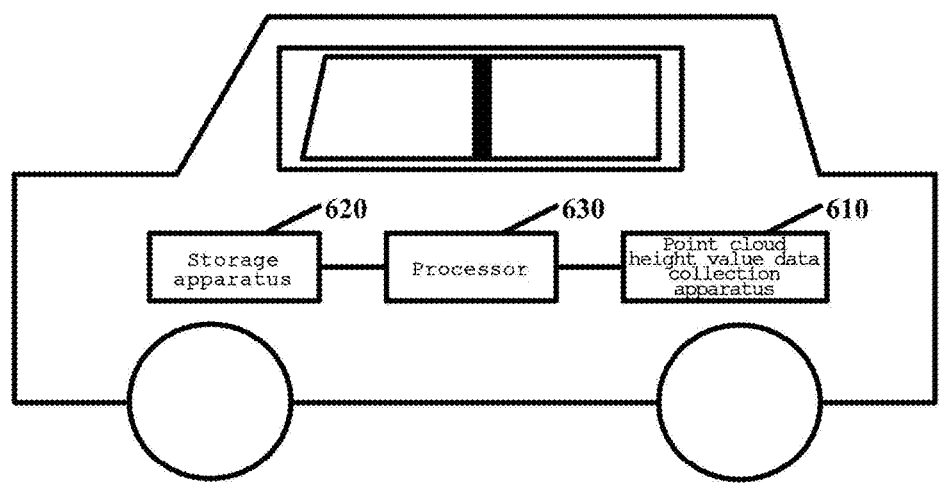
FIG. 6 is a schematic structural diagram of an unmanned vehicle according to an embodiment of the present application.

Referring to FIG. 6, a schematic structural diagram 600 of an embodiment of an unmanned vehicle according to some embodiments of the present application is shown.

As shown in FIG. 6, the unmanned vehicle may comprise a point cloud height value data collection apparatus 610, a storage apparatus 620 and a processor 630.

The point cloud height value data collection apparatus 610 may be configured to collect laser point cloud height value data of a current position of the unmanned vehicle, wherein the laser point cloud height value data comprises coordinates of laser points and height values corresponding to the laser points.

The storage apparatus 620 may be configured to store a laser point cloud height value map.

The processor 630 may be configured to project the laser point cloud height value data to the horizontal earth plane to generate laser point cloud projection data, determine a first matching probability of the laser point cloud projection data in a predetermined range of the laser point cloud height value map by using a position of a predetermined prior positioning position in the laser point cloud height value map as an initial position, and determine a positioning of the unmanned vehicle in the laser point cloud height value map based on the first matching probability.

In some alternative implementations, the laser point cloud height value map may comprise M×N map areas by dividing the Earth surface in a horizontal earth plane of a world coordinate system, the map areas having an identical size and shape. Each of the map areas may further comprise m×n map grids, the map grids having an identical size and shape. The laser point cloud height value map may further comprise an average of height values of laser points corresponding to the positioning position of the map grid and the number of laser points corresponding to the positioning position of the map grid.

In some alternative implementations, the first coordinate of each of the laser points may be a coordinate of each of the laser points within the first laser point cloud height value data, in a vehicle coordinate system of the unmanned vehicle.

The processor 630 may be further configured to convert the first laser point cloud height value data into third laser point cloud height value data, and to project the third laser point cloud height value data to the horizontal earth plane to generate laser point cloud projection data. The third laser point cloud height value data comprises third coordinates of laser points and height values corresponding to the laser points within the first laser point cloud height value data, wherein the third coordinate is a coordinate of a laser point within the first laser point cloud height value data in the world coordinate system.

In some alternative implementations, the third coordinate X' is $X'=(x', y', z')^T=RX+T$.

R is a rotation matrix for a transformation from the vehicle coordinate system of the unmanned vehicle to the world coordinate system, $X=(x, y, z)^T$ is the first coordinate of the laser point within the first laser point cloud height value data, and T is a translation matrix for a transformation from the vehicle coordinate system of the unmanned vehicle to the world coordinate system.

In some alternative implementations, the laser point cloud projection data comprises projection coordinates of the laser points within the first laser point cloud height value data, an average of height values of laser points in projection grids, and the number of the laser points in the projection grids.

The projection coordinate X" of the laser point within the first laser point cloud height value data meets: $X''=(x'', y'')^T=SX'$.

S is a projection matrix, and meets:

$$S = \begin{bmatrix} 1 & 0 & 0 \\ 0 & 1 & 0 \end{bmatrix};$$

and
each of the projection grids has the size and shape identical to that of the map grid.

In some alternative implementations, the processor 630 may be further configured to: overlap a center projection grid O(x, y) of the laser point cloud projection data with a map grid corresponding to the prior positioning position O'($x_o$, $y_o$) in the laser point cloud height value map, wherein the center projection grid O(x, y) is a projection grid representing a vehicle body of the unmanned vehicle in the laser point cloud projection data; determine a first matching probability of a projection range of the laser point cloud projection data and a corresponding map range; and moving the center projection grid O(x, y) by a preset offset k, and determine the first matching probabilities of the laser point cloud projection data corresponding to the current center projection grid O(x, y), respectively.

The processor 630 may be further configured to determine a position of the unmanned vehicle in the laser point cloud height value map based on a weighted average of the first matching probabilities.

In some alternative implementations, the first matching probability P(x, y) corresponding to the center projection grid O(x, y) is defined as:

$$P(x, y) = \alpha^{-\frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r}};$$

where (x, y) is a world coordinate of the center projection grid, ($x_i$, $y_j$) is a world coordinate of the projection grid in the projection range of the laser point cloud projection data, α is a preset constant parameter, $\mu_{x_i,y_j}^m$ is an average of height values of laser points in the map grid whose world coordinate is ($x_i$, $y_j$), $\mu_{x_i,y_j}^r$ is an average of height values of laser points in the projection grid whose world coordinate is ($x_i$, $y_j$), and $N_{x_i,y_j}^r$ is the number of laser points in the projection grid whose world coordinate is ($x_i$, $y_j$).

In some alternative implementations, the processor 630 may be further configured to: update the first matching probability based on the previous positioning position. The updated first matching probability P'(x, y) is defined as:

$$P'(x,y)=\eta P(x,y)\overline{P}(x,y);$$

where $\overline{P}$(x, y) is a probability of the unmanned vehicle currently presenting at a position having a world coordinate (x, y) predicted based on the previous positioning position, and η is a preset normalization coefficient.

In some alternative implementations, the position ($\bar{x}$,$\bar{y}$) of the unmanned vehicle in the laser point cloud height value map determined by the processor 630 may be defined as:

$$\begin{cases} \bar{x} = \dfrac{\sum_{i=-k}^{k} \sum_{j=-k}^{k} P'(x_0+i, y_0+j)^\alpha \cdot (x+i)}{\sum_{i=-k}^{k} \sum_{j=-k}^{k} P'(x_0+i, y_0+j)^\alpha} \\ \bar{y} = \dfrac{\sum_{i=-k}^{k} \sum_{j=-k}^{k} P'(x_0+i, y_0+j)^\alpha \cdot (y_0+j)}{\sum_{i=-k}^{k} \sum_{j=-k}^{k} P'(x_0+i, y_0+j)^\alpha} \end{cases},$$

where ($x_0$, $y_0$) is a world coordinate of a map grid where the prior positioning position is located.

In some other alternative implementations, the processor 630 may be further configured to further divide the map grids in the predetermined range, so that each of the map grids is formed of p×q sub-grids.

The position ($\bar{x}$,$\bar{y}$) of the unmanned vehicle in the laser point cloud height value map is defined as:

$$\begin{cases} \bar{x} = \dfrac{\sum_{x=x_o-k}^{x_o+k} \sum_{y=y_o-k}^{y_o+k} \eta(x) P''(x, y)^\alpha \cdot x}{\sum_{x=x_o-k}^{x_o+k} \sum_{y=y_o-k}^{y_o+k} \eta(x) P''(x, y)^\alpha} \\ \bar{y} = \dfrac{\sum_{x=x_o-k}^{x_o+k} \sum_{y=y_o-k}^{y_o+k} \eta(y) P''(x, y)^\alpha \cdot y}{\sum_{x=x_o-k}^{x_o+k} \sum_{y=y_o-k}^{y_o+k} \eta(y) P''(x, y)^\alpha} \end{cases};$$

wherein:
($x_0$, $y_0$) is a world coordinate of a map grid where the prior positioning position is located, a step length of x varying in the range [$x_o$−k, $x_o$+k] is $$\frac{1}{p},$$

and a step length of y varying in the range [$y_o$−k, $y_o$+k] is $$\frac{1}{q}; \begin{cases} \eta(x) = \dfrac{1}{(x-x_o)^\beta} \\ \eta(y) = \dfrac{1}{(y-y_o)^\beta} \end{cases};$$

and
β is a preset constant parameter, and P"(x, y) is a probability obtained by conducting bilinear interpolation on the first matching probability when a map grid where (x, y) is located is used as the center projection grid.

Figure 7:
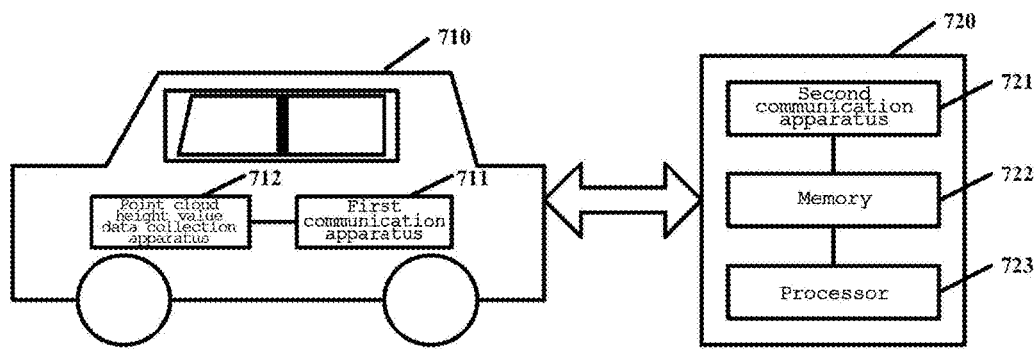
FIG. 7 is a schematic structural diagram of a system for positioning an unmanned vehicle according to an embodiment of the present application.

Referring to FIG. 7, a schematic structural diagram 700 of a system for positioning an unmanned vehicle according to an embodiment of the present application is shown.

The system for positioning an unmanned vehicle in this embodiment may comprise an unmanned vehicle 710 and a positioning server 720.

The unmanned vehicle 710 may comprise a point cloud height value data collection apparatus 712 and a first communication apparatus 711.

The point cloud height value data collection apparatus 711 may be configured to collect laser point cloud height value data of a current position of the unmanned vehicle, wherein the laser point cloud height value data comprises first coordinates of laser points and height values corresponding to the laser points. The first communication apparatus 712 may be configured to send the laser point cloud height value data to the positioning server.

The positioning server 720 may comprise a second communication apparatus 721, a memory 722, and a processor 723.

The second communication apparatus 721 may be configured to receive the laser point cloud height value data sent by the first communication apparatus 711. The memory 722 may be configured to store a laser point cloud height value map.

The processor 723 may be configured to project the laser point cloud height value data to the horizontal earth plane to generate laser point cloud projection data, determine a first matching probability of the laser point cloud projection data in a predetermined area of the laser point cloud height value map by using a position of a predetermined prior positioning position in the laser point cloud height value map as an initial position, and determine a positioning result of the unmanned vehicle based on the first matching probability. The positioning result comprises position information of the unmanned vehicle in the laser point cloud height value map.

Moreover, the second communication apparatus 721 is further configured to send the positioning result to the first communication apparatus 711.

In some alternative implementations, the laser point cloud height value map may comprise M×N map areas by dividing the Earth surface in a horizontal earth plane of a world coordinate system, the map areas having an identical size and shape. Each of the map areas may further comprise m×n map grids, the map grids having an identical size and shape. The laser point cloud height value map further comprises an average of height values of laser points corresponding to the positioning position of the map grid and the number of laser points corresponding to the positioning position of the map grid.

In some alternative implementations, the first coordinate of each of the laser points may be a coordinate of each of the laser points within the first laser point cloud height value data, in a vehicle coordinate system of the unmanned vehicle.

The processor 723 may be further configured to convert the first laser point cloud height value data into third laser point cloud height value data, and to project the third laser point cloud height value data to the horizontal earth plane to generate laser point cloud projection data. The third laser point cloud height value data comprises third coordinates of laser points and height values corresponding to the laser points within the first laser point cloud height value data, wherein the third coordinate is a coordinate of a laser point within the first laser point cloud height value data in the world coordinate system.

In some alternative implementations, the third coordinate X' is $X'=(x', y', z')^T=RX+T$.

R is a rotation matrix for a transformation from the vehicle coordinate system of the unmanned vehicle to the world coordinate system, $X=(x, y, z)^T$ is the first coordinate of the laser point within the first laser point cloud height value data, and T is a translation matrix for a transformation from the vehicle coordinate system of the unmanned vehicle to the world coordinate system.

In some alternative implementations, the laser point cloud projection data comprises projection coordinates of the laser points within the first laser point cloud height value data, an average of height values of laser points in projection grids, and the number of the laser points in the projection grids.

The projection coordinate X" of the laser point within the first laser point cloud height value data meets: $X"=(x", y")^T=SX'$.

S is a projection matrix, and meets:

$$S = \begin{bmatrix} 1 & 0 & 0 \\ 0 & 1 & 0 \end{bmatrix};$$

and
each of the projection grids has the size and shape identical to that of the map grid.

In some alternative implementations, the processor 723 may be further configured to: overlap a center projection grid O(x, y) of the laser point cloud projection data with a map grid corresponding to the prior positioning position $O'(x_o, y_o)$ in the laser point cloud height value map, wherein the center projection grid O(x, y) is a projection grid representing a vehicle body of the unmanned vehicle in the laser point cloud projection data; determine a first matching probability of a projection range of the laser point cloud projection data and a corresponding map range; and moving the center projection grid O(x, y) by the predetermined offset k, and determine the first matching probabilities of the laser point cloud projection data corresponding to the current center projection grid O(x, y), respectively.

The processor 723 may be further configured to determine a position of the unmanned vehicle in the laser point cloud height value map based on a weighted average of the first matching probabilities.

In some alternative implementations, the first matching probability P(x, y) corresponding to the center projection grid O(x, y) is defined as:

$$P(x, y) = \alpha - \frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r};$$

where (x, y) is a world coordinate of the center projection grid, $(x_1, y_j)$ is a world coordinate of the projection grid in the projection range of the laser point cloud projection data, α is a preset constant parameter, $\mu_{x_i,y_j}^m$ is an average of height values of laser points in the map grid whose world coordinate is $(x_i, y_j)$, $\mu_{x_i,y_j}^r$ is an average of height values of laser points in the projection grid whose world coordinate is $(x_i, y_j)$, and $N_{x_i,y_j}^r$ is the number of laser points in the projection grid whose world coordinate is $(x_i, y_j)$.

In some alternative implementations, the processor 723 may be further configured to update the first matching probability based on the previous positioning position. The updated first matching probability P'(x, y) is defined as:

$$P'(x,y)=\eta P(x,y)\overline{P}(x,y);$$

where $\overline{P}(x, y)$ is a probability of the unmanned vehicle currently presenting at a position having a world coordinate (x, y) predicted based on the previous positioning position, and η is a preset normalization coefficient.

In some alternative implementations, the position $(\bar{x},\bar{y})$ of the unmanned vehicle in the laser point cloud height value map determined by the processor 723 may be defined as:

$$\begin{cases} \bar{x} = \dfrac{\sum\limits_{i=-k}^{k}\sum\limits_{j=-k}^{k} P'(x_0+i, y_0+j)^\alpha \cdot (x+i)}{\sum\limits_{i=-k}^{k}\sum\limits_{j=-k}^{k} P'(x_0+i, y_0+j)^\alpha}, \\ \bar{y} = \dfrac{\sum\limits_{i=-k}^{k}\sum\limits_{j=-k}^{k} P'(x_0+i, y_0+j)^\alpha \cdot (y_0+j)}{\sum\limits_{i=-k}^{k}\sum\limits_{j=-k}^{k} P'(x_0+i, y_0+j)^\alpha} \end{cases}$$

where $(x_0, y_0)$ is a world coordinate of a map grid where the prior positioning position is located.

In some other alternative implementations, the processor 723 may be further configured to further divide the map grids in the predetermined range, so that each of the map grids is formed of p×q sub-grids.

The position $(\bar{x},\bar{y})$ of the unmanned vehicle in the laser point cloud height value map is defined as:

$$\begin{cases} \bar{x} = \dfrac{\sum\limits_{x=x_o-k}^{x_o+k}\sum\limits_{y=y_o-k}^{y_o+k} \eta(x)P''(x,y)^\alpha \cdot x}{\sum\limits_{x=x_o-k}^{x_o+k}\sum\limits_{y=y_o-k}^{y_o+k} \eta(x)P''(x,y)^\alpha}; \\ \bar{y} = \dfrac{\sum\limits_{x=x_o-k}^{x_o+k}\sum\limits_{y=y_o-k}^{y_o+k} \eta(y)P''(x,y)^\alpha \cdot y}{\sum\limits_{x=x_o-k}^{x_o+k}\sum\limits_{y=y_o-k}^{y_o+k} \eta(y)P''(x,y)^\alpha} \end{cases}$$

wherein:

$(x_0, y_0)$ is a world coordinate of a map grid where the prior positioning position is located, a step length of x varying in the range $[x_o-k, x_o+k]$ is $$\frac{1}{p},$$

and a step length of y varying in the range $[y_o-k, y_o+k]$ is $$\frac{1}{q}; \begin{cases} \eta(x) = \dfrac{1}{(x-x_o)^\beta} \\ \eta(y) = \dfrac{1}{(y-y_o)^\beta} \end{cases};$$

and

β is a preset constant parameter, and P''(x, y) is a probability obtained by conducting bilinear interpolation on the first matching probability when a map grid where (x, y) is located is used as the center projection grid.

Figure 8:
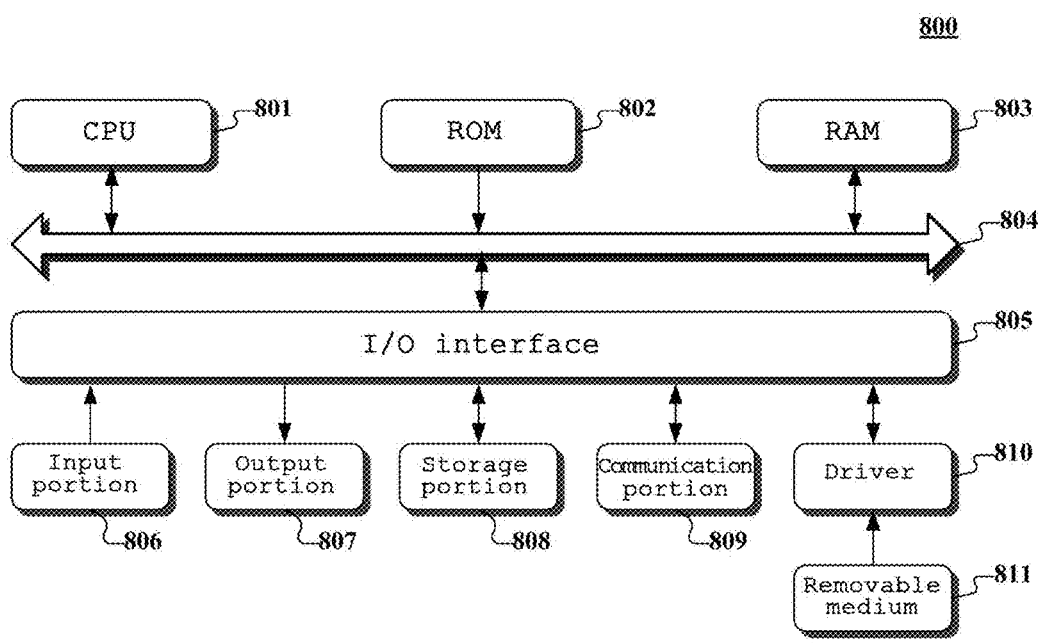
FIG. 8 is a schematic structural diagram of a computer system applicable to implement a processor or a positioning server of an unmanned vehicle according to an embodiment of the present application.

Reference is now made to FIG. 8, which illustrates a schematic structural diagram of a computer system 800 adapted to implement the processor or positioning server of the unmanned vehicle according to the embodiments of the present application.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 809, and/or may be installed from the removable media 811.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units according to the embodiments of the present application may be implemented by software or hardware. The described units may be disposed in the processors. For example, a following description may be made. A processor comprises an acquisition module, a conversion module, a matching probability determination module, and a position determination module. The names of these modules are not intended to limit the corresponding modules. For example, the acquisition module may also be referred to as a module for acquiring first laser point cloud height value data matching a current position of the unmanned vehicle.

In another aspect, some embodiments of the present application further provide a nonvolatile computer storage medium. The nonvolatile computer storage medium may be the nonvolatile computer storage medium included in the apparatus in the above embodiments, or a stand-alone nonvolatile computer storage medium which has not been assembled into the apparatus. The nonvolatile computer storage medium stores one or more programs. When the one or more programs are executed by an apparatus, the apparatus is caused to perform: acquiring first laser point cloud height value data matching a current position of the unmanned vehicle, the first laser point cloud height value data comprising first coordinates of laser points and height values corresponding to the laser points within the first laser point cloud height value data; converting the first laser point cloud height value data into laser point cloud projection data in a horizontal earth plane; determining a first matching probability of the laser point cloud projection data in a predetermined range of a laser point cloud height value map by using a position of a predetermined prior positioning position in the laser point cloud height value map as an initial position; and determining a position of the unmanned vehicle in the laser point cloud height value map based on the first matching probability.

The foregoing is a description of the some embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for positioning an unmanned vehicle based on a laser point cloud height value matching, comprising:
    irradiating objects around a vehicle with a laser, and generating reflected laser points from the irradiated objects to create a laser point cloud, each reflected laser point having coordinates and a height value;
    acquiring, by a computer processor, first laser point cloud height value data matching a current position of the unmanned vehicle;
    converting the first laser point cloud height value data into laser point cloud projection data in a horizontal earth plane;
    determining a first matching probability of the laser point cloud projection data in a predetermined range of a laser point cloud height value map by using a position of a predetermined prior positioning position in the laser point cloud height value map as an initial position, the laser point cloud height value map being generated by:
        dividing the Earth surface into M×N map areas in a horizontal earth plane of a world coordinate system;
        dividing each of the map areas into m×n map grids;
        collecting second laser point cloud height value data corresponding to positioning positions of each of the map grids, the second laser point cloud height value data comprising second coordinates of laser points in the world coordinate system and height values corresponding to the laser points within the second laser point cloud height value data; and
        storing corresponding map data in each of the map grids, the map data comprising an average of height values of laser points in a positioning position corresponding to the map grid and a number of the laser points in the positioning position corresponding to the map grid; and
    determining a position of the unmanned vehicle in the laser point cloud height value map based on the first matching probability.

2. The method according to claim 1, wherein the map areas have an identical size and shape.

3. The method according to claim 1, wherein a first coordinate of each of the laser points is a coordinate of each of the laser points within the first laser point cloud height value data, in a vehicle coordinate system of the unmanned vehicle;
    the converting the first laser point cloud height value data into laser point cloud projection data in a horizontal earth plane comprising:
    converting the first laser point cloud height value data into third laser point cloud height value data, the third laser point cloud height value data comprising third coordinates of laser points and height values corresponding to the laser points within the first laser point cloud height value data, the third coordinate being a coordinate of each of the laser points within the first laser point cloud height value data in the world coordinate system; and
    projecting the third laser point cloud height value data to the horizontal earth plane to generate the laser point cloud projection data.

4. The method according to claim 3, wherein the third coordinate X' is defined as:

$$X'=(x',y',z')^T=RX+T;$$

where R is a rotation matrix for a transformation from the vehicle coordinate system of the unmanned vehicle to the world coordinate system, $X=(x, y, z)^T$ is the first coordinate of each of the laser points within the first laser point cloud height value data, and T is a translation matrix for a transformation from the vehicle coordinate system of the unmanned vehicle to the world coordinate system.

5. The method according to claim 4, wherein:
    the laser point cloud projection data comprises projection coordinates of the laser points within the first laser point cloud height value data, an average of height values of laser points in projection grids, and a number of the laser points in the projection grids;
    where the projection coordinate X" of each of the laser points within the first laser point cloud height value data meets:

$$X''=(x'',y'')^T=SX';$$

S being a projection matrix and meeting:

$$S=\begin{bmatrix} 1 & 0 & 0 \\ 0 & 1 & 0 \end{bmatrix};$$

and
    each of the projection grids having a size and shape identical to the size and shape of the map grid.

6. The method according to claim 5, the determining a first matching probability of the laser point cloud projection data in a predetermined range of a laser point cloud height value map by using a position of a predetermined prior positioning position in the laser point cloud height value map as an initial position comprising:

overlapping a center projection grid O(x, y) of the laser point cloud projection data with a map grid corresponding to the prior positioning position O'($x_o$, $y_o$) in the laser point cloud height value map, wherein the center projection grid O(x, y) is a projection grid representing a vehicle body of the unmanned vehicle in the laser point cloud projection data;

determining a first matching probability of a projection range of the laser point cloud projection data and a corresponding map range;

moving the center projection grid O(x, y) by a predetermined offset k, and respectively determining the first matching probability of the laser point cloud projection data corresponding to the current center projection grid O(x, y); and the determining a position of the unmanned vehicle in the laser point cloud height value map based on the first matching probability comprising:

determining a position of the unmanned vehicle in the laser point cloud height value map based on a weighted average of the first matching probability.

7. The method according to claim 6, wherein:
the first matching probability P(x, y) corresponding to the center projection grid O(x, y) is defined as:

$$P(x, y) = \alpha - \frac{\sum_{x_i=x_1}^{x_m} \sum_{y_j=y_1}^{y_n} |\mu_{x_i,y_j}^m - \mu_{x_i,y_j}^r| N_{x_i,y_j}^r}{\sum_{x_i=x_1}^{x_m} \sum_{y_j=y_1}^{y_n} N_{x_i,y_j}^r};$$

wherein (x, y) is a world coordinate of the center projection grid, ($x_i$, $y_j$) is a world coordinate of each of the projection grids in the projection range of the laser point cloud projection data, a is a preset constant parameter, $\mu_{x_i,y_j}^m$ is an average of height values of laser points in the map grid having a world coordinate (xi, yj), $\mu_{x_i,y_j}^m$ is an average of height values of laser points in the projection grid having a world coordinate ($x_i$, $y_j$), and $\mu_{x_i,y_j}^m$ is a number of laser points in the projection grid having a world coordinate ($x_i$, $y_j$).

8. The method according to claim 7, the determining a first matching probability of the laser point cloud projection data in a predetermined range of a laser point cloud height value map by using a position of a predetermined prior positioning position in the laser point cloud height value map as an initial position further comprising:

updating the first matching probability based on a previous positioning position, the updated first matching probability P'(x, y) being defined as:

$$P'(x,y) = \eta P(x,y)\overline{P}(x,y);$$

where $\overline{P}$(x, y) is a probability of the unmanned vehicle currently presenting at a position having a world coordinate (x, y) predicted based on the previous positioning position, and η is a preset normalization coefficient.

9. The method according to claim 8, wherein a position ($\overline{x}$, $\overline{y}$) of the unmanned vehicle in the laser point cloud height value map is defined as:

$$\begin{cases} \overline{x} = \dfrac{\sum_{i=-k}^{k} \sum_{j=-k}^{k} P'(x_0+i, y_0+j)^\alpha \cdot (x_0+i)}{\sum_{i=-k}^{k} \sum_{j=-k}^{k} P'(x_0+i, y_0+j)^\alpha} \\ \overline{y} = \dfrac{\sum_{i=-k}^{k} \sum_{j=-k}^{k} P'(x_0+i, y_0+j)^\alpha \cdot (y_0+j)}{\sum_{i=-k}^{k} \sum_{j=-k}^{k} P'(x_0+i, y_0+j)^\alpha} \end{cases};$$

wherein ($x_0$, $y_0$) is a world coordinate of a map grid where the prior positioning position is located.

10. The method according to claim 8, the determining the position of the unmanned vehicle in the laser point cloud height value map based on the first matching probability comprising:

dividing the map grids in the predetermined range, so that each of the map grids is formed of p×q sub-grids;

the position ($\overline{x}$, $\overline{y}$) of the unmanned vehicle in the laser point cloud height value map is defined as:

$$\begin{cases} \overline{x} = \dfrac{\sum_{x=x_o-k}^{x_o+k} \sum_{y=y_o-k}^{y_o+k} \eta(x) P''(x,y)^\alpha \cdot x}{\sum_{x=x_o-k}^{x_o+k} \sum_{y=y_o-k}^{y_o+k} \eta(x) P''(x,y)^\alpha} \\ \overline{y} = \dfrac{\sum_{x=x_o-k}^{x_o+k} \sum_{y=y_o-k}^{y_o+k} \eta(y) P''(x,y)^\alpha \cdot y}{\sum_{x=x_o-k}^{x_o+k} \sum_{y=y_o-k}^{y_o+k} \eta(y) P''(x,y)^\alpha} \end{cases};$$

wherein:
($x_0$, $y_0$) is a world coordinate of a map grid where the prior positioning position is located, a step length of x varying in a range [$x_o-k$, $x_o+k$] is $$\frac{1}{p},$$

and a step length of y varying in a range [$y_o-k$, $y_o+k$] is $$\frac{1}{q}; \begin{cases} \eta(x) = \dfrac{1}{(x-x_o)^\beta} \\ \eta(y) = \dfrac{1}{(y-y_o)^\beta} \end{cases};$$

and

β is a preset constant parameter, and P''(x, y) is a probability obtained by conducting a bilinear interpolation on the first matching probability when a map grid where (x, y) is located is used as the center projection grid.

11. The method according to claim 1, wherein the map grids have an identical size and shape.

12. An apparatus for positioning an unmanned vehicle based on a laser point cloud height value matching, comprising:

a laser point cloud collection apparatus configured to irradiate objects around the vehicle and generate reflected laser points from the irradiated objects to create a laser point cloud, each reflected laser point having coordinates and a height value;
an acquisition module configured to acquire first laser point cloud height value data matching a current position of an unmanned vehicle;
a conversion module configured to convert the first laser point cloud height value data into laser point cloud projection data in a horizontal earth plane;
a matching probability determination module configured to determine a first matching probability of the laser point cloud projection data in a predetermined range of a laser point cloud height value map by using a position of a predetermined prior positioning position in the laser point cloud height value map as an initial position, the laser point cloud height value map comprising M×N map areas by dividing the Earth surface in a horizontal earth plane of a world coordinate system, each of the map areas further comprising m×n map grids; the laser point cloud height value map further comprising an average of height values of laser points corresponding to a positioning position corresponding to the map grid and a number of the laser points in the positioning position corresponding to the map grid; and
a position determination module configured to determine a position of the unmanned vehicle in the laser point cloud height value map based on the first matching probability.

13. The apparatus according to claim 12, wherein the map areas have an identical size and shape.

14. The apparatus according to claim 12, wherein the map grids have an identical size and shape.

15. An unmanned vehicle, comprising:
a point cloud height value data collection apparatus configured to irradiate objects around the vehicle and generate reflected laser points from the irradiated objects to create a laser point cloud, each reflected laser point having coordinates and a height value, the point cloud height value data collection apparatus further configured to collect laser point cloud height value data of a current position of the unmanned vehicle;
a storage apparatus configured to store a laser point cloud height value map, the laser point cloud height value map being generated by:
dividing the Earth surface into M×N map areas in a horizontal earth plane of a world coordinate system;
dividing each of the map areas into m×n map grids;
collecting second laser point cloud height value data corresponding to positioning positions of each of the map grids, the second laser point cloud height value data comprising second coordinates of laser points in the world coordinate system and height values corresponding to the laser points within the second laser point cloud height value data; and
storing corresponding map data in each of the map grids, the map data comprising an average of height values of laser points in a positioning position corresponding to the map grid and a number of the laser points in the positioning position corresponding to the map grid; and
a processor configured to:
project the laser point cloud height value data to a horizontal earth plane to generate laser point cloud projection data;
determine a first matching probability of the laser point cloud projection data in a predetermined range of the laser point cloud height value map by using a position of a predetermined prior positioning position in the laser point cloud height value map as an initial position; and
determine a position of the unmanned vehicle in the laser point cloud height value map based on the first matching probability.

16. The unmanned vehicle according to claim 15, wherein the map areas have an identical size and shape.

17. A system for positioning an unmanned vehicle, comprising an unmanned vehicle and a positioning server, wherein
the unmanned vehicle comprises:
a point cloud height value data collection apparatus configured to:
irradiate objects around the vehicle and generate reflected laser points from the irradiated objects to create a laser point cloud, each reflected laser point having coordinates and a height value; and
collect laser point cloud height value data of a current position of the unmanned vehicle, the laser point cloud height value data comprising coordinates of laser points and height values corresponding to the laser points;
and a first communication apparatus;
wherein the point cloud height value data collection apparatus collects laser point cloud height value data of a current position of the unmanned vehicle, the laser point cloud height value data comprising first coordinates of laser points and height values corresponding to the laser points; and
the first communication apparatus is configured to send the laser point cloud height value data to the positioning server;
the positioning server comprises:
a second communication apparatus, a memory, and a processor;
the second communication apparatus is configured to receive the laser point cloud height value data sent by the first communication apparatus;
the memory is configured to store a laser point cloud height value map, the laser point cloud height value map comprising M×N map areas by dividing the Earth surface in a horizontal earth plane of a world coordinate system; each of the map areas further comprises m×n map grids; and the laser point cloud height value map further comprising an average of height values of laser points corresponding to a positioning position of the map grid and a number of the laser points corresponding to the positioning position of the map grid;
the processor is configured to project the laser point cloud height value data to a horizontal earth plane to generate laser point cloud projection data, determine a first matching probability of the laser point cloud projection data in a predetermined area of the laser point cloud height value map by using a position of a predetermined prior positioning position in the laser point cloud height value map as an initial position, and determine a positioning result of the unmanned vehicle based on the first matching probability, the positioning result comprising position information of the unmanned vehicle in the laser point cloud height value map; and
the second communication apparatus is further configured to send the positioning result to the first communication apparatus.

18. The system for positioning the unmanned vehicle according to claim 17, wherein:
the map areas have an identical size and shape.

19. A non-transitory storage medium storing one or more programs, the one or more programs when executed by an apparatus, cause the apparatus to perform a method for positioning an unmanned vehicle based on a laser point cloud height value matching, the method comprising:

irradiating objects around a vehicle with a laser, and generating reflected laser points from the irradiated objects to create a laser point cloud, each reflected laser point having coordinates and a height value;

acquiring first laser point cloud height value data matching a current position of the unmanned vehicle;

converting the first laser point cloud height value data into laser point cloud projection data in a horizontal earth plane;

determining a first matching probability of the laser point cloud projection data in a predetermined range of a laser point cloud height value map by using a position of a predetermined prior positioning position in the laser point cloud height value map as an initial position, the laser point cloud height value map being generated by:

dividing the Earth surface into M×N map areas in a horizontal earth plane of a world coordinate system;

dividing each of the map areas into m×n map grids;

collecting second laser point cloud height value data corresponding to positioning positions of each of the map grids, the second laser point cloud height value data comprising second coordinates of laser points in the world coordinate system and height values corresponding to the laser points within the second laser point cloud height value data; and storing corresponding map data in each of the map grids, the map data comprising an average of height values of laser points in a positioning position corresponding to the map grid and a number of the laser points in the positioning position corresponding to the map grid; and determining a position of the unmanned vehicle in the laser point cloud height value map based on the first matching probability.

20. The non-transitory storage medium according to claim 19, wherein the map areas have an identical size and shape.

\* \* \* \* \*